Dec. 25, 1962 T. N. LOWRY 3,070,677

SWITCHING DEVICE

Filed Feb. 27, 1961

INVENTOR
T. N. LOWRY
BY F. R. McCorkendale
ATTORNEY

United States Patent Office 3,070,677
Patented Dec. 25, 1962

3,070,677
SWITCHING DEVICE

Terrell N. Lowry, Boonton, N.J., assignor to Bell Telephone Laboratories, Incorporated, New York, N.Y., a corporation of New York Filed Feb. 27, 1961, Ser. No. 91,781
17 Claims. (Cl. 200—87)

This invention relates to electrically controlled switching devices and more particularly to such a device utilizing a magnetic field to effect movement of a switch contact.

For many years an important, indeed an essential, element of telephone systems and other communication systems has been the electromechanical switch or relay. These devices have proven to be economical and reliable means for interconnecting circuits and, further, have utilized metallic contacts for completing the transmission paths.

There has recently been described, for example in the article "An experimental Switching System Using New Electronic Techniques," by A. E. Joel, Jr., Bell System Technical Journal, vol. 37, September 1958, page 1091, a telephone system utilizing electronic switching and operating at a speed many fold greater than that of present commercial systems. The types of electromechanical relays now in commercial use do not approach with respect to response time the minimum requirements of the electronic switching system, even though they do provide the highly desirable economic and reliability factors and, further, utilize metallic contacts for completion of the transmission paths.

There have recently been proposed several designs of switching devices intended to render the relatively slow response mechanical switch compatible with the high speed electronic control signals, one such type of device being disclosed in United States Patent 2,995,637, issued August 8, 1961 on application Serial No. 824,222, filed July 1, 1959, A. Feiner, C. A. Lovell, T. N. Lowry and P. G. Ridinger. In general, these devices propose to attain the referred to compatibility by combining a bistable remanently magnetic element with a magnetically responsive mechanical switch.

My invention also utilizes the above general combination and, accordingly, it is an object of the present invention to improve the performance of an electromechanical relay.

Another object of the invention is to improve the response time characteristic of an electromechanical relay whereby to render feasible its use in high speed switching circuits.

A still further object of the invention is to eliminate external magnetic radiation from an electromechanical relay whereby to prevent undesirable magnetic interaction between adjacently mounted devices.

In accordance with one specific embodiment of the invention a glass sealed reed switch is encompassed by two interleaved windings distributed lengthwise in a single layer along the glass enclosing vessel, the reeds being of a magnetically soft material and including end contact portions and resilient support portions. A toroidal end member of magnetically remanent material is positioned at each end of the glass enclosing vessel, each toroidal member encompassing the terminal portion of a respective reed. The entire assembly is enclosed with a cylindrical housing of highly-permeable, magnetically-soft material which serves both to provide a return flux path and as a magnetic shield to prevent undesired magnetic interaction with adjacently mounted devices. Operation of the device, i.e., closure of the reeds, is achieved by coincident-current excitation of both windings to produce magnetic fields of the same polarity; this produces remanent radial magnetization patterns in each toroidal end member and causes the reeds to close and latch in closed position. The magnetically latched reeds may be opened by passing a high-amplitude, short-duration current through the closed reeds whereby to change the magnetization pattern in the toroidal end members from a radial pattern to a circumferential pattern.

In accordance with another specific embodiment of the invention the over-all arrangement is generally similar to that above described except for the fact that the ferrite end pieces are omitted and ferrite members are positioned at the free end of each reed. This embodiment provides latching means controllable independently of the operating means.

In accordance with still another embodiment of the invention ferrite members are positioned on each reed approximately midway between the two ends thereof. This embodiment provides for release of operated contacts by two alternative and independent nonmarginal techniques.

A feature of the present invention is the utilization of a current pulse passed through the closed contact members of a reed switch for setting the magnetic states of a pair of magnetically remanent members which are magnetically coupled to the respective contact members.

A further feature of the invention is the utilization of a current pulse passed through the closed contact members of a reed switch for changing the magnetic states of a pair of magnetically remanent members magnetically coupled to the respective contact members from one definite flux pattern to a second definite flux pattern.

A still further feature of the invention is the utilization of a current pulse passed through the closed contact members of a reed switch for circumferentially magnetizing a pair of magnetically remanent members which are magnetically coupled to the respective contact members.

The utilization of a current pulse passed through the closed contacts of a reed switch, as set forth above and as described in detail subsequently, provides a novel, nonmarginal method of controlling operations of the switch through establishment and alteration of the magnet patterns of magnetically remanent members magnectically coupled to the respective contact members. For example, in one embodiment as described below, the method is utilized for obtaining nonmarginal release control of the contacts at the end of a telephone conversation by pulsing through the speech path.

A full understanding of the arrangement contemplated by the present invention as well as an appreciation of the various advantageous features thereof may be gained from consideration of the following detailed description in connection with the accompanying drawing in which.

Figure 1:
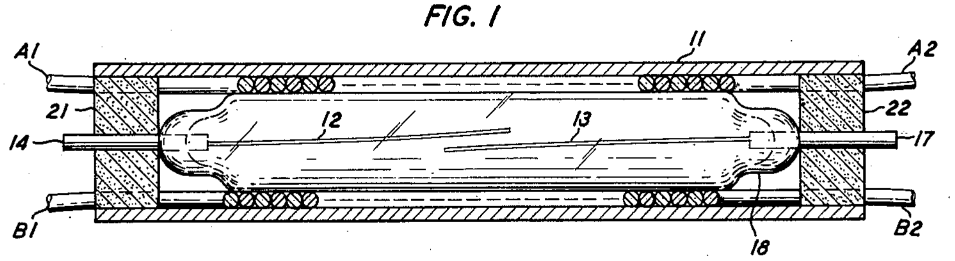
FIG. 1 is a side elevation, in partial section, of one specific illustrative embodiment of the invention.

Referring now to the drawing and first to FIG. 1, the device illustrated comprises a cylindrical housing 11 of permalloy within which is positioned a glass sealed reed switch of the general type disclosed in United States Patent 2,289,830, issued July 14, 1942 to W. B. Ellwood. The reed switch comprises two opposed reed members 12 and 13, of magnetically soft material, terminating respectively in terminal members 14 and 17, the reeds being sealed within glass vessel 18. Two windings A1—A2 and B1—B2 (see also FIG. 2) surround vessel 18, being interleaved whereby to form a single layer winding around the reed switch. Normally, that is in the absence of controlling flux, the opposed overlapping ends of reeds 12 and 13 are held in separated position by the inherent spring bias of the reeds.

Toroidal members 21 and 22 are positioned in the respective ends of cylindrical housing 11; these end members are of a material exhibiting a plurality of stable remanent magnetic states, which material may advantageously be one of the ferrites such as are used for magnetic memory cores. End members 21 and 22 encompass those portions of respective terminal members 14 and 17 which protrude through glass envelope 18.

Operation of the switch, that is closure of reeds 12 and 13, is accomplished by coincident current (additive) excitation of windings A1—A2, and B1—B2, for example from respective pulse sources 23 and 24 (FIG. 2), which results in a flux path longitudinally down through the axis of the reed switch, radially outward through one end member, for example, member 22, back through the wall of magnetic housing 11, and radially inward through the other end member 21. (The flux path of end member 22 for this condition is indicated schematically in FIG. 3.)

The above excitation of the windings may be by a short, high speed pulse of current, but the described magnetic pattern is maintained by the ferrite end members 21 and 22 acting as memory elements and the reed members 12 and 13 are caused to close in the normal response time of the switch. Also, once closed, the reeds are held closed by this memory action, it not being necessary to provide a holding current through the windings for this purpose.

Figure 3:
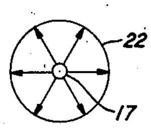
FIG. 3 is a schematic representation of the flux paths resulting in one of the ferrite end pieces of the device of FIG. 1 from one particular current distribution.
Figure 4:
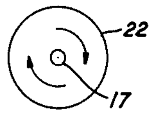
FIG. 4 is a schematic representation of the flux paths resulting in the ferrite end piece from a different current distribution.

Now, in accordance with the novel arrangement contemplated by the invention, release of the contacts, that is separation of reeds 12 and 13, is accomplished by passing a high-amplitude, short-duration current pulse, for example from pulse source 25 (FIG. 2), through the closed reeds 12 and 13 themselves, that is between terminal members 14 and 17. This will change the magnetization pattern of the end members 21 and 22 from radial (FIG. 3) to circular (FIG. 4). It will be obvious that with these circular patterns all of the flux will be contained within the end members themselves and the path through the reed members 12 and 13 and housing 11 will no longer be maintained. Reeds 12 and 12 will therefore separate due to their inherent spring bias in the normal release period of the switch.

It should be noted that the release pulse, while of high amplitude, may be of extremely short duration, since it need only change the magnetic pattern of the magnetically remanent ferrite members. Actual separation of the reed members takes place after the termination of the current pulse therethrough so that there is no problem of surge currents, arcing, or the like. Also, magnetic margins need not be observed on the release operation; that is, there is no danger of falsely reclosing the reeds. The use of axial excitation through the closed reeds enhances the application of the switch in telephone network control; for example, release may be accomplished by pulsing through the speech path when conversation is ended.

Cylindrical housing 11, preferably of permalloy, acts both as a conductive element in the flux path as described above and as a magnetic shield to prevent external magnetic radiation from the switch. This permits a plurality of the devices to be mounted in closely adjacent positions in a switching array without encountering difficulty arising from magnetic interaction between adjacent devices. Devices of the type described will commonly be used in pairs for crosspoint application where two-conductor switching is required, and in such application it is essential that means be provided for preventing magnetic interaction between one crosspoint pair and another crosspoint pair as well as between the paired devices themselves.

Figure 5:
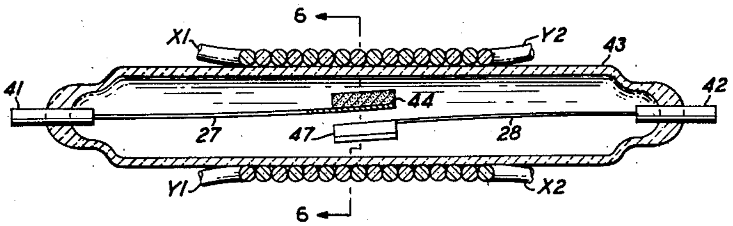
FIG. 5 is a side elevation, in partial section, of a second specific illustrative embodiment of the invention.
Figure 6:
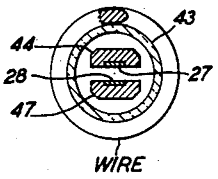
FIG. 6 is a sectional view taken on line 6—6 of FIG. 5 showing particularly the arrangement of the ferrite members on the switch reeds.

Referring now to FIGS. 5 and 6 a second embodiment of the invention is illustrated which includes, as in the first embodiment, a glass sealed switch assembly surrounded by two interleaved windings, X1—X2 and Y1—Y2, wound in a single layer around the assembly. The sealed switch assembly includes soft magnetic reeds 27 and 28, which terminate respectively in terminal members 41 and 42; the terminal members are sealed through glass vessel 43. If desired, the contact members may be of other configuration than that illustrated, for example, square bars. In such event it may be desirable to provide a constricted area in each to act as a hinge.

A ferrite "shoe" is positioned at the free end of each reed, ferrite member 44 being positioned on the upper surface of reed 27 and ferrite member 47 being positioned on the underneath surface of reed 28. It will be understood, of course, that reeds 27 and 28 act as contact carrying elements just as in the ordinary reed type switch and, when closed, complete a conductive path between terminals 41 and 42.

In this embodiment the magnetically remanent members 44 and 47 are provided for the purpose of producing a magnetic latching action, if desired, after the reeds have been closed; the members are not switched prior to actual physical motion of the reeds. With the reeds in open or separated position the normal magnetization of ferrite members 44 and 47 is in a direction parallel to the long axis of the switch.

Figure 2:
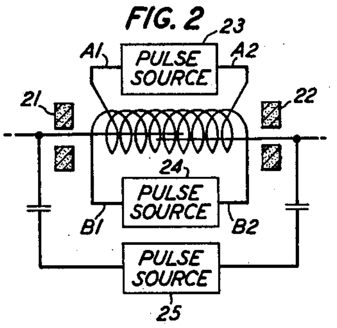
FIG. 2 is a schematic representation of a portion of a circuit, including pulse sources, which may be utilized in the operation of the device of FIG. 1.

It will be understood that an operating circuit will be provided for this embodiment which will include suitable pulse sources and which may be generally similar to that represented schematically in FIG. 2.

Reeds 27 and 28 may be closed by coincident current excitation of both windings X1—X2 and Y1—Y2 to produce an axial magnetic field; unlike magnetic poles are created at the opposed contact ends of reeds 27 and 28 thereby urging them into closed position. The magnetic condition of ferrite members 44 and 47 is not substantially affected at this point and the device operates as an ordinary reed switch. That is, reeds 27 and 28 are held closed only so long as the above excitation of the windings continues; when the current is discontinued and the magnetic field produced thereby collapses, reeds 27 and 28 will return to open position due to their inherent spring bias.

However, if while reeds 27 and 28 are in closed position, a pulse of current (which should be of relatively high amplitude but which may be of very brief duration)

is passed in either direction through the closed reeds between terminals 41 and 42, the magnetically remanent members 44 and 47 will become magnetized in a circumferential direction and the engaged ends of reeds 27 and 28 will be encircled by the resulting lines of flux. This will produce a sufficient attractive force to hold the reeds in closed condition so that the switch will be latched in closed position even though the excitation current in the windings is discontinued.

Reeds 27 and 28 may preferably be released by again energizing windings X1—X2 and Y1—Y2 whereby to restore axial magnetization of ferrite member 44 and 47; this energization may be either by a very short pulse of current, resulting in forthwith opening of the contacts within the release time characteristic of the device, or by a sustained current which would nullify the latching action of the ferrite members but would maintain the contacts closed under control of the energizing current applied to the windings.

It will be obvious that the novel arrangement described above provides a latching action which is optional, since it is rendered effective after the contacts have been closed, only by an additional circuit action. However, once the latching action has been established, it is maintained by the action of the ferrite members and no holding current is required.

Figure 7:
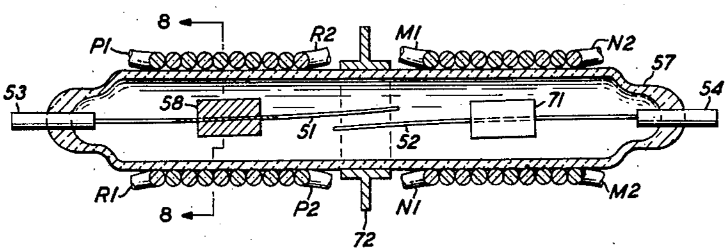
FIG. 7 is a side elevation in partial section of a third specific illustrative embodiment of the invention.
Figure 8:
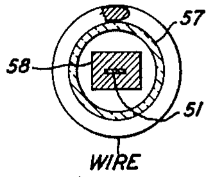
FIG. 8 is a sectional view taken on line 8—8 of FIG. 7 showing particularly the arrangement of one ferrite block on the respective switch reed.

A third embodiment of the invention is shown in FIGS. 7 and 8 to which reference will now be made. In this embodiment a glass sealed switch assembly is surrounded by four interleaved windings P1—P2; R1—R2; M1—M2; and N1—N2 arranged in a single layer as in the previously described devices. The switch assembly includes soft magnetic reeds 51 and 52—terminating in respective terminal members 53 and 54 and enclosed within glass vessel 57. Here again, as in the above embodiment, the contact members may be of configuration other than that illustrated and constricted areas may be provided as hinges. A ferrite block is mounted on each reed approximately midway between the ends thereof, ferrite member 58 being mounted on reed 51 and ferrite member 71 being mounted on reed 52. It will be noted that the four windings are separated into pairs, windings P1—P2 and R1—R2 being, in effect, associated with reed 51 and windings M1—M2 and N1—N2 being associated with reed 52.

Here again it will be understood that a suitable operating circuit, including the required pulse sources, will be provided for the described embodiment.

Reeds 51 and 52 will close following longitudinal magnetization of ferrite members 58 and 71 in the same direction since this will establish unlike poles at the free ends of the respective reeds; this magnetic state is established by either single or coincident excitation of either or both pairs of windings. Release is preferably accomplished by passing a current pulse (which should be of relatively high amplitude but which may be of very brief duration) through the path formed by the closed reeds themselves, that is between terminals 53 and 54. This produces circumferential magnetization in both remanent members 58 and 71 in a manner similar to that prevailing in the operation of the embodiment of FIG. 1 described above. Alternatively, release may be accomplished by energization of the windings in a manner to effect longitudinal magnetization of the two members 58 and 71 in respectively opposite directions. If the device is being used in a telephone switching network, for example, the first-mentioned method of release might well be used when a telephone conversation has been completed, release being accomplished by pulsing through the speech path. However, in the event, for example, that a connection is abandoned before the various paths have been completed, it may then be desirable to release "through the coil," that is by use of the second method.

If desired, magnetic shunt 72 may be provided whereby to improve the release sensitivity of the device under certain conditions; element 72 acts to reduce the effective air reluctance shunting the individual magnetic sections.

While certain specific embodiments of the invention have been selected for detailed disclosure, the invention is not, of course, limited in its application to the embodiments disclosed. The embodiments which have been described should be taken as illustrative rather than restrictive thereof.

What is claimed is:

1. An electromagnetic switching device comprising a reed switch including a pair of magnetically soft reed contact members, each of said contact members including a resilient support portion, control winding means encompassing said switch for effecting closure of said contact members, a magnetically remanent member magnetically coupled to each of said contact members, and means for pasing a current pulse through said closed contact members for setting the magnetic states of said remanent members, said remanent members being directly adjacent to said respective support portions and being radially magnetized by said control winding means and being circumferentially magnetized by said current pulse through said closed contact members to release said contact members.

2. An electromagnetic switching device comprising a tubular enclosing vessel, a pair of magnetically soft reed contact members sealed within said vessel with opposed contact portions normally held in separated position by inherent spring bias, means including control coil means positioned around the outside wall of said vessel and magnetically coupled with said contact members for moving said contact members to closed position, a pair of magnetically remanent members, one of said last-mentioned pair of members being adjacent to and magnetically coupled with one of said contact members and the other of said pair being adjacent to and magnetically coupled with other of said contact members, and means for passing a current pulse through the path completed by the closed contact members effective to change the magnetic pattern of said magnetically remanent members.

3. An electromagnetic switching device comprising a pair of magnetically soft reed contact members, control coil means magnetically coupled with said contact members, a pair of magnetically remanent members, one of said pair of magnetically remanent members being adjacent to and magnetically coupled with one of said contact members and the other of said pair being being adajcent to and magnetically coupled with the other of said contact members, means for energizing said control coil means whereby to establish in said magnetically remanent members a magnetic pattern effective to hold said contact members in closed position, and means for passing a current pulse through the path completed by the closed contact members effective to change the magnetic pattern in said magnetically remanent members whereby to release said contact members.

4. An electromagnetic switching device comprising a tubular enclosing vessel, a pair of magnetically soft reed contact members sealed within said vessel with opposed contact portions normally held in separated position by inherent spring bias, control coil means positioned around the outside wall of said vessel and magnetically coupled with said contact members, a pair of members of a magnetic material capable of assuming a plurality of stable remanent magnetization states, one of said last-mentioned pair of members being adjacent to and magnetically coupled with one of said contact members and the other of said pair being adjacent to and magnetically coupled with the other of said contact members, means for energizing said control coil means whereby to establish in said magnetically remanent members a first of said magnetization states effective to hold said contact members in closed position against said inherent spring biasing force, and means for passing a current pulse through the path formed by the closed contact members effective to establish in said magnetically remanent members a second of said magnetization states effective to release said contact members whereby to permit movement thereof to open position by inherent spring bias.

5. An electromagnetic switching device comprising an enclosing vessel, a pair of magnetically soft reed contact members sealed within said vessel, each of said contact members having a terminal member projecting through a respective end portion of said vessel, a pair of toroidal magnetically remanent members, one of said last-mentioned members being positioned adjacent to one end portion of said vessel and magnetically coupled with one of said contact members and the other of said members being positioned adjacent to the other end portion of said vessel and magnetically coupled with the other of said contact members, control coil means positioned around the outside wall of said vessel and magnetically coupled with said contact members, means for energizing said control coil means whereby to establish a flux path including said contact members, said terminal members and said magnetically remanent members and effective to move said contact members to closed position and to hold them in that position, and means for passing a current pulse through the closed contact members from one of said terminal members to the other effective to interrupt said flux path in said magnetically remanent members and to release said contact members.

6. An electromagnetic switching device comprising a tubular enclosing vessel, a pair of magnetically soft reed contact members sealed within said vessel with their opposed contact portions normally held in separated position by inherent spring bias, control coil means positioned around the outside wall of said vessel and magnetically coupled with said contact members, a pair of toroidal members of a magnetic material capable of assuming a plurality of stable remanent magnetization states, one of said last-mentioned members being positioned adjacent to one end portion of said vessel and magnetically coupled with one of said contact members and the other of said members being positioned adjacent to the other end portion of said vessel and magnetically coupled with the other of said contact members, means for energizing said control coil means whereby to establish in said toroidal members a first of said magnetization states effective to move said contact members into closed position against the inherent spring biasing force and to hold the contact members in said closed position, and means for passing a current pulse through the path formed by the closed contact members effective to establish in said toroidal members a second of said magnetization states effective to release said contact members whereby to permit their movement to open position by inherent spring bias.

7. An electromagnetic switching device comprising a tubular enclosing vessel, a pair of magnetically soft reed contact members sealed within said vessel with their opposed contact portions normally held in separated position by inherent spring bias, control coil means positioned around the outside wall of said vessel and magnetically coupled with said contact members, a pair of toroidal members of a magnetic material capable of assuming a plurality of stable remanent magnetization states, one of said last-mentioned members being positioned adjacent to one end portion of said vessel and magnetically coupled with one of said contact members and the other of said members being positioned adjacent to the other end portion of said vessel and magnetically coupled with the other of said contact members, means for energizing said control coil means whereby to set up in said toroidal members radial flux patterns and to establish a flux path including both of said toroidal members and both of said contact members and effective to move said contact members into closed position against the inherent spring biasing force and to hold the contact members in said closed position, and means for passing a current pulse through the path formed by the closed contact members effective to change the flux pattern in said toroidal members to a circular path whereby to interrupt said flux path and release said contact members to permit movement thereof to open position by inherent spring bias.

8. An electromagnetic switching device comprising a tubular enclosing vessel, a pair of magnetically soft reed contact members sealed within said vessel with their opposed contact portions normally held in separated position by inherent spring bias, control coil means positioned around the outside wall of said vessel and magnetically coupled with said contact members, a pair of toroidal members of a magnetic material capable of assuming a plurality of stable remanent magnetization states including a first stable state in which radial flux patterns are established in said toroidal members and a second stable state in which circular flux patterns are established in said toroidal members, one of said toroidal members being positioned adjacent to one end portion of said vessel and magnetically coupled with one of said contact members and the other of said toroidal members being positioned adjacent to the other end portion of said vessel and magnetically coupled with the other of said contact members, a housing of highly permeable magnetic material enclosing said vessel, said control coil means and said toroidal members, means for energizing said control coil means whereby to cause said toroidal members to assume said first stable state and to establish a flux path through said toroidal members, said contact members and said housing effective to move said contact members into closed position against the inherent spring biasing force and to hold the contact members in closed position, and means for passing a current pulse through the path formed by the closed contact members effective to cause said toroidal members to assume said second stable state whereby to interrupt said flux path and release said contact members to permit movement thereof to open position by inherent spring bias.

9. An electromagnetic switching device comprising a tubular enclosing vessel, a terminal member sealed at each end of said vessel and extending within said vessel, a pair of magnetically soft reed contact members within said vessel connected respectively to said terminal members, the respective free ends of said reed contact members being in close proximity to each other but normally being held separated by the inherent spring bias of said reed members, control coil means positioned around the outside wall of said vessel and magnetically coupled with said contact members, a pair of toroidal members of a magnetic material capable of assuming a plurality of stable remanent magnetization states, one of said toroidal members being positioned adjacent to one end portion of said vessel, encompassing one of said terminal members and magnetically coupled therethrough to one of said contact members, the other of said toroidal members being positioned adjacent to the other end portion of said vessel, encompassing the other of said terminal members and magnetically coupled therethrough to the other of said contact members, a housing of highly permeable magnetic material enclosing said vessel, said control coil means and said toroidal members, means for energizing said control coil means whereby to set up in said toroidal members radial flux patterns and to establish a closed flux path through said toroidal members, said contact members and said housing effective to move the free ends of said contact members into closed position against the inherent spring biasing force and to hold the contact members in closed position, and means for passing a current pulse from one of said terminal members through the closed contact members to the other of said terminal members effective to change the flux patterns of said toroidal members to circular patterns whereby to interrupt the flux path and release said contact members to permit movement thereof to open position by inherent spring bias.

10. An electromagnetic switching device comprising a tubular enclosing vessel, a terminal member sealed at each end of said vessel and extending within said vessel, a pair of magnetically soft elongated contact members within said vessel, connected respectively to said terminal members, the respective free ends of said contact members being in close proximity to each other but normally being held separated by the inherent spring bias of said contact members, control coil means positioned around the outside wall of said vessel and magnetically coupled with said contact members, a pair of shoe members of magnetically remanent material, one of said shoe members being positioned on the upper surface of one of said contact members at the free end thereof and the other of said shoe members being positioned on the underneath surface of the other of said contact members at the free end thereof, means for energizing said control coil means whereby to move said contact members into closed position against the inherent spring bias and to hold said members in said closed position while the energization of said control coil means is continued, and means independent of said control coil means effective while said contact members are in closed position for rendering said shoe members effective to hold said contact members in closed position after energization of said control coil means has ceased.

11. An electromagnetic switching device comprising a tubular enclosing vessel, a terminal member sealed at each end of said vessel and extending within said vessel, a pair of magnetically soft elongated contact members within said vessel connected respectively to said terminal members, the respective free ends of said contact members being in close proximity to each other but normally being held separated by the inherent spring bias of said contact members, control coil means positioned around the outside wall of said vessel and magnetically coupled with said contact members, a pair of shoe members of magnetically remanent material, one of said shoe members being positioned on the upper surface of one of said contact members at the free end thereof and the other of said shoe members being positioned on the underneath surface of the other of said contact members at the free end thereof, means for energizing said control means whereby to move said contact members into closed position against the inherent spring bias and to hold said members in said closed position while the energization of said control coil means is continued, and means independent of said control coil means effective while said contact members are in closed position for establishing a circular flux path around said shoe members effective to maintain said contact members in closed position after energization of said control coil means has been terminated.

12. An electromagnetic switching device comprising a tubular enclosing vessel, a terminal member sealed at each end of said vessel and extending within said vessel, a pair of magnetically soft elongated contact members within said vessel connected respectively to said terminal members, the respective free ends of said contact members being in close proximity to each other but normally being held separated by the inherent spring bias of said contact members, control coil means positioned around the outside wall of said vessel and magnetically coupled with said contact members, a pair of shoe members of magnetically remanent material, one of said shoe members being positioned on the upper surface of one of said contact members at the free end thereof and the other of said shoe members being positioned on the underneath surface of the other of said contact members at the free end thereof, means for energizing said control coil means whereby to move said contact members into closed position against the inherent spring bias and to hold said members in said closed position while the energization of said control coil means is continued, means independent of said control coil means for applying through said contact members in said closed position for establishing a circular flux path around said shoe members effective to maintain said contact members in closed position after energization of said control coil means has been terminated, and means for breaking down said circular flux path whereby to release said contact members.

13. An electromagnetic switching device comprising a tubular enclosing vessel, a terminal member sealed at each end of said vessel and extending within said vessel, a pair of magnetically soft elongated contact members within said vessel connected respectively to said terminal members, the respective free ends of said contact members being in close proximity to each other but normally being held separated by the inherent spring bias of said contact members, control coil means positioned around the outside wall of said vessel and magnetically coupled with said contact members, a block of magnetic material positioned on each of said contact members between the respective two ends thereof, said blocks being of a magnetic material capable of assuming a plurality of stable remanent magnetization states including a first stable state in which longitudinal flux patterns are established therein and a second stable state in which circular flux patterns are established therein, means for energizing said control coil means whereby to cause said block members to assume said first stable state and to establish longitudinal flux patterns in said block members effective to move said contact members into closed position against the inherent spring bias and to hold said contact members in closed position, and means for causing said block members to assume said second stable state whereby to change the longitudinal flux patterns in said block members to circular flux patterns and to release said contact members for return to open position by the inherent spring bias.

14. An electromagnetic switching device in accordance with claim 13 wherein said last-mentioned means includes means for applying through said contact members in the closed position.

15. An electromagnetic switching device comprising a tubular enclosing vessel, a pair of magnetically soft elongated contact members sealed within said vessel, the respective free ends of said contact members being in close proximity to each other but normally being held separated by the inherent spring bias of said contact members, a control coil means positioned around the outside wall of said vessel and magnetically coupled with said contact members, a pair of shoe members of magnetically remanent material, one of said shoe members being positioned on the upper surface of one of said contact members at the free end thereof and the other of said shoe members being positioned on the underneath surface of the other of said contact members at the free end thereof, means for energizing said control coil means whereby to move said contact members into closed position against the inherent spring bias and to hold said members in said closed position while the energization of said control coil means is continued, and means for passing a current pulse through the path formed by the closed contact members whereby to establish a circular flux path around said shoe members effective to maintain said contact members in closed position after energization of said control coil means has been terminated.

16. An electromagnetic switching device comprising a reed switch including contact members, each of said contact members having a support end and a free contact end, winding means, and at least one remanently magnetic member magnetically coupled to said contact members, means for energizing said winding means to close said contact members and to set said remanent member in a first state of magnetization, and means for passing a current pulse through the closed contact members to set said remanent member in a circumferential state of magnetization to release said contact members, said remanent member being positioned between said free and support ends of one of said contact members, said first state of magnetization being axial in said remanent magnetic member.

17. An electromagnetic switching device comprising a reed switch including a pair of magnetically soft reed contact members, each of said contact members including a resilient support portion and a contact portion, control winding means encompassing said switch for effecting closure of said contact members, a magnetically remanent member magnetically coupled to each of said contact members, and means for passing a current pulse through said closed contact members for setting the magnetic states of said remanent members, said remanent members being mounted directly adjacent the contact portions of said reed contact members, said current pulse through said closed contact members setting said remanent members so that said remanent members, considered as a unit, are circumferentially magnetized to maintain said contact members closed.

References Cited in the file of this patent

UNITED STATES PATENTS

| | | |
|---|---|---|
| 2,414,476 | Mathes | Jan. 21, 1947 |
| 2,877,315 | Oliver | Mar. 10, 1959 |
| 2,935,656 | Baker | May 3, 1960 |
| 2,981,810 | Nitsch | Apr. 25, 1960 |
| 2,992,306 | Feiner | July 11, 1961 |
| 2,995,637 | Feiner et al. | Aug. 8, 1961 |